United States Patent

[11] 3,568,887

| [72] | Inventors | William H. Jacobs<br>Chestnut Hill;<br>Robert L. Norton, Norfolk, Mass. |
|---|---|---|
| [21] | Appl. No. | 682,343 |
| [22] | Filed | Nov. 13, 1967 |
| [45] | Patented | Mar. 9, 1971 |
| [73] | Assignee | Jet Spray Cooler, Inc.<br>Waltham, Mass. |

[54] HOT BEVERAGE DISPENSER
6 Claims, 8 Drawing Figs.

[52] U.S. Cl.................................................. 222/70,
222/129.4
[51] Int. Cl................................................... B67d 5/08,
B67d 5/56
[50] Field of Search............................................ 222/129.4,
129.1, 129.3, 70

[56] References Cited
UNITED STATES PATENTS

| 2,796,200 | 6/1957 | Lambert et al. | 222/129.4 |
| 2,802,599 | 8/1957 | Callahan et al. | 222/129.4X |
| 2,977,026 | 3/1961 | Delgado | 222/129.4 |
| 3,266,670 | 8/1966 | Brooks et al. | 222/129.4X |
| 3,335,911 | 8/1967 | Stutz | 222/129.4X |
| 3,159,190 | 12/1964 | Skiera et al. | 222/70X |

*Primary Examiner*—Samuel F. Coleman
*Assistant Examiner*—H. S. Lane
*Attorney*—Wolf, Greenfield, Hieken & Sacks

ABSTRACT: A hot chocolate dispenser having a water heater and a powder flavor pot and an adjustable timing means for dispensing different size drinks by dispensing variable quantities of water and powder.

PATENTED MAR 9 1971 3,568,887

INVENTORS
WILLIAM H. JACOBS
ROBERT L. NORTON

BY Wolf, Greenfield & Sacks

ATTORNEYS

INVENTORS
WILLIAM H. JACOBS
ROBERT L. NORTON
BY
ATTORNEYS

PATENTED MAR 9 1971
3,568,887
SHEET 4 OF 4
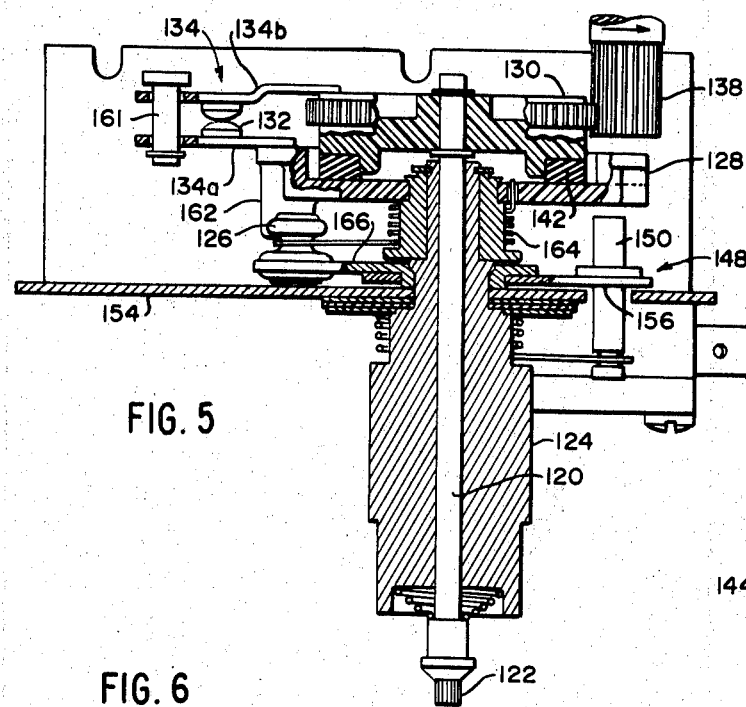
FIG. 5
FIG. 6
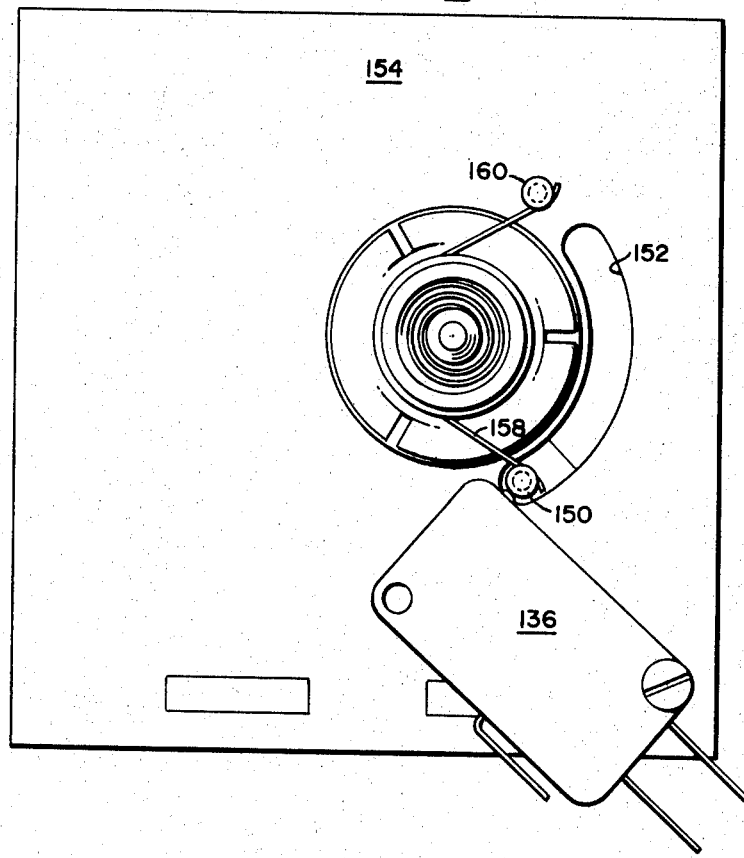
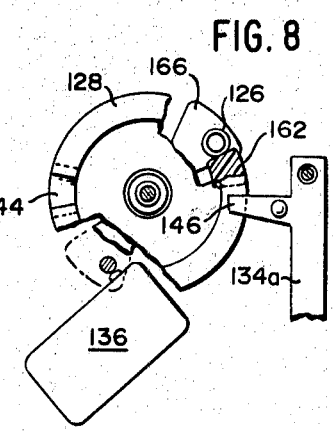
FIG. 8
FIG. 7
INVENTORS
WILLIAM H. JACOBS
ROBERT L. NORTON
BY
Wolf, Greenfield + Hicken
ATTORNEYS

HOT BEVERAGE DISPENSER

This invention relates to beverage dispensers and more particularly comprises a new and improved counter top dispenser particularly suitable for dispensing hot drinks such as hot chocolate and other similar drinks which are powder flavored.

One important object of this invention is to provide a hot beverage dispenser which may be readily cleaned.

Another important object of this invention is to provide a hot beverage dispenser which has a self-cleaning action so as to prevent the caking of flavor powder throughout the dispensing system.

Another important object of this invention is to provide a hot beverage dispenser which produces a frothy topping on the beverage and which eliminates any residue of unmixed flavor powder.

Yet another important object of this invention is to provide a hot beverage dispenser having a readily accessible powder container which may be removed easily for refilling and cleaning.

Still another important object of this invention is to provide a beverage dispenser which allows the user to draw either hot water or hot water mixed with flavor powder from the dispenser.

And another object of this invention is to provide in a hot beverage dispenser an easy means for purging the hot water tank of the dispenser.

And still another important object of the invention is to provide a beverage dispenser which dispenses a uniform proportion of powder and water regardless of changes in line water pressure.

And yet another important object of this invention is to provide a timer motor control for beverage dispensers which allows for a continuously adjustable portion control which may be set for two or more drink sizes within its total range.

And another important object of the invention is to provide a timer motor control for beverage dispensers that may be adjusted by the customer.

And another important object of this invention is to provide a timer motor control for beverage dispensers which sets a constant interval between two functions controlled by it regardless of the setting of the timer control cycle.

To accomplish these and other objects, the hot beverage dispenser of this invention includes a housing within which is disposed a heating tank for water, a solenoid valve for controlling the discharge of water from the tank and appropriate fittings for conducting the water from the tank to a whipping assembly and discharge spout. Also disposed in the housing is a motor for driving the whipping assembly and a second motor which is designed to automatically connect to a powder storage and agitation pot. A readily accessible platform is provided on the front upper portion of the housing for supporting the powder storage and agitation pot, and the second motor provided drives a worm feed forming part of the pot to discharge powder into the whipping assembly. A timing circuit controls the energization of the solenoid valve and motors so as to control the size of the portions of powder and water discharged into the whipping assembly and the period of agitation of the powder and water in the assembly.

The timing circuit includes a manually adjustable timer which allows the customer to vary the size of the drink. Typically, this adjustment may be used to allow the customer to select a large or small drink.

These and other objects and features of this invention along with its incident advantages will be better understood and appreciated from the following detailed description of a preferred embodiment thereof, selected for purposes of illustration and shown in the accompanying drawing, in which:

FIG. 5 is a cross-sectional view of the timer motor control which forms part of the timing circuit;

FIG. 6 is a front view of the control shown in FIG. 5;

FIG. 7 is a fragmentary detail view of the control with the cam in the locked position; and FIG. 8 is a view similar to FIG. 7 but showing the cam in the tripped position at the beginning of the timing cycle.

Throughout the remainder of this description the dispenser will be described in terms of its use as a hot chocolate dispenser. However, it is to be understood that the invention is not confined to that specific use, but rather is suitable for use for other beverages made by mixing powder and hot or cold water.

Figure 1:
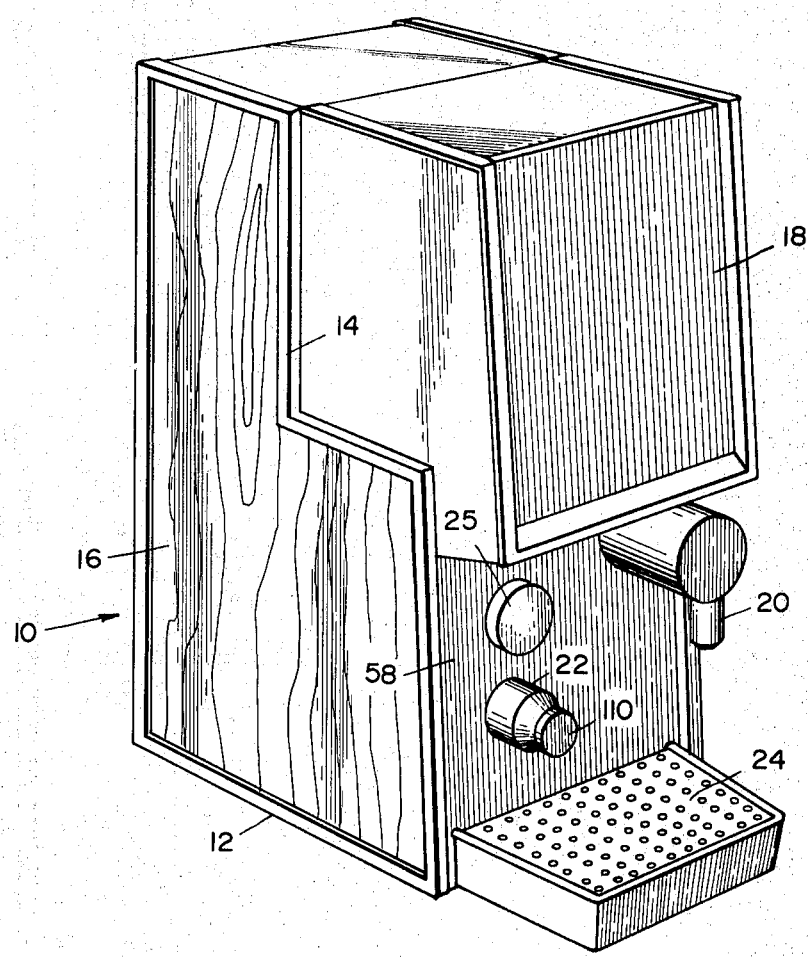
FIG. 1 is a perspective view of a beverage dispenser constructed in accordance with this invention.

The dispenser shown in FIG. 1 includes 10 composed of a base 12, extruded frame members 14, side panels 16, a removable hood 18, discharge nozzle 20, actuating control and time limit knob 22, drip pan 24 and hot water button 25. Hot chocolate is drawn from the dispenser by placing a cup on the drip pan 24 and actuating the timer assembly by control knob 22.

Figure 2:
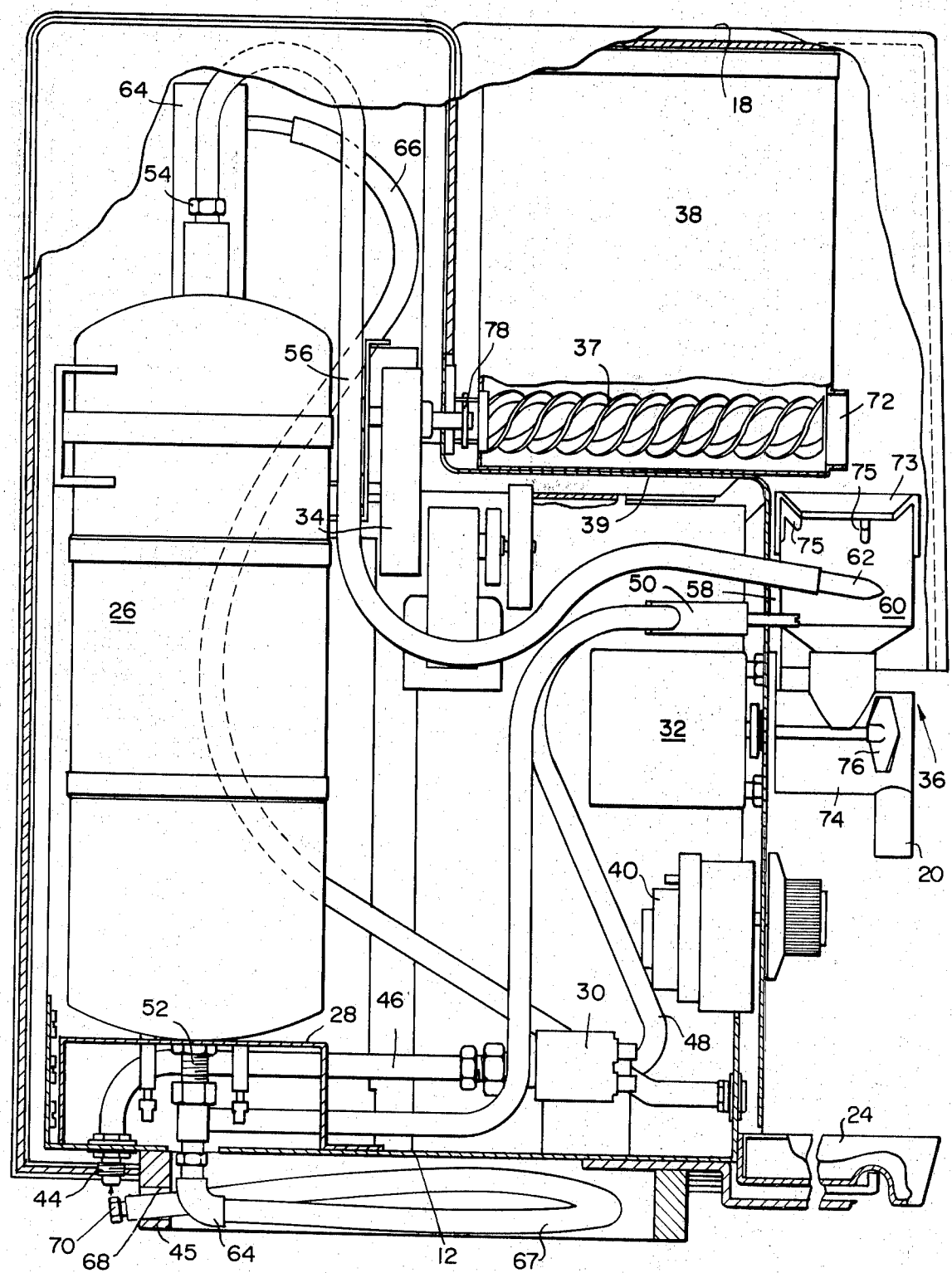
FIG. 2 is a side view of the beverage dispenser shown in FIG. 1 with a side panel removed so that the interior of the housing is exposed.

In FIG. 2 the housing is shown to contain a heating tank 26 mounted vertically on bracket 28 supported on the base 12, a solenoid valve 30 for controlling discharge of the hot water from the tank by controlling the water directed into it, whipping motor 32, and worm drive motor 34, the motors 32 and 34 being positioned to drive the whipping assembly 36 and the worm feed 37 of the powder agitation pot 38 mounted externally of the housing on shelf 39. The heating tank 26 contains a 1,300 watt heating element 40 shown schematically in FIG. 3 which in turn is controlled by a thermostat 42 to maintain the water temperature in the tank at about 180° F. An inlet water fitting 44 is disposed at the bottom of the housing beside the supporting base 12 outside pedestal 45, and the fitting 44 is connected to a hose or pipe 46 which passes the inlet water to the solenoid valve 30. A hose 48 connects the discharge of the solenoid valve 30 through a needle valve 50 to the tank at fitting 52 where the water enters the tank. Hot water is discharged from the tank 26 through a fitting 54 and tube 56 through the front panel 58 of the housing to the funnel 60 that forms part of the whipping assembly 36 mounted on the front panel. It will be noted in FIG. 2 that a tangential entry fitting 62 is secured to the sidewall of the funnel 60 so as to allow the hot water entering the funnel to enter tangentially and spin about the inside of the funnel sidewall. The tank 26 is also provided with a vent 64 having an emergency overflow tube 66 to facilitate filling of the tank and allow for some overflow when expansion is caused by heating. It will be noted that the tube 66 terminates at the front panel 58 just above the drip tray 24.

The T fitting 52 secured to the bottom of the tank 26 not only permits filling of the tank but further allows the tank to be drained whenever necessary. In FIG. 2 it will be noted that the T-fitting is connected through an elbow 64 to a flexible hose 67 disposed beneath the base 12 and within the pedestal 45. The flexible hose 67 is looped around within the space enclosed by the pedestal and extends through pedestal opening 68. A pipe plug 79 is secured to the end of the tube 67 that extends beyond the opening 68 to form a stopper for the tube, and it also prevents the tube from being pulled through the opening 68 so that its end is completely confined within the pedestal. When it is desired to empty the tank 26, the tube 67 may be pulled through the opening 68 so that substantially its full length is exposed which will facilitate directing the water in the tank to a convenient sink.

It is apparent in FIG. 2 that the chocolate powder contained in the pot 38 is discharged into the funnel 60 of the whipping assembly when the worm feed 37 is actuated. The powder is dumped through outlet 72 in the pot base, and a baffle 73 at the top of the funnel serves to direct the powder into the funnel center. The powder and the water introduced into the funnel from the pot 38 and the tank 26, respectively, pass through the funnel into the whipping chamber 74, and in the chamber 74 the propeller blade 76 driven by motor 32 at approximately 1,600 r.p.m. thoroughly mixes the two together. Because the water enters the funnel 60 through the tangential fitting 62 and forms a vortex as it flows about the funnel wall, the powder discharged through the opening 72 in the canister base will drop quickly through the funnel and the vortex into the whipping chamber 74. Consequently, the powder does not leave a residue in the funnel 60 because the water remains in the funnel longer than the powder due to its swirling action on the funnel wall.

As will be explained below in connection with the timing cycle, the whipping motor 32 runs somewhat longer than the motor 34 and remains in operative condition after the solenoid 30 closes. Consequently, a greater whipping action takes place in the chamber 74 than would otherwise occur, to create a more thorough mixing and to wash off the chamber wall, any residue of unmixed chocolate powder. Thus the whipping action of the propeller blade 76 tends to perform a self-cleaning action by agitating the water in the chamber, which tends to retain the water in the chamber for a prolonged period. In addition, the continued operation of the propeller 76 causes a frothy topping to be formed at the top of the drink as air mixes with the water and powder toward the end of the cycle when the contents of the chamber 74 is diminished by discharge through the nozzle 20.

The baffle 73 at the top of the funnel 60 prevents water from spinning out the top of the funnel, and a number of ribs 75 spaced beneath the baffle 73 immediately below its bottom surface support the baffle in the proper position on the funnel.

In FIGS. 1 and 2 the hood 18 is shown to rest inside the extruded frame members 14 so as to cover the pot 38 and the funnel 60 of the whipping assembly 36. The hood may be removed merely by lifting it off the panels which support it. When the hood is removed it is evident that the pot 38 may be removed from the shelf 39 formed on the front panel 58 merely by drawing it forward so as to uncouple the coupling 78 which connects the worm feed 37 with the shaft of the motor 34. Pot 38 may just as easily be replaced by putting it on the shelf 39 and pushing the portion of the coupling 78 carried by the pot and connected directly to the worm feed 37 against the mating portion of the coupling carried by the shaft of motor 34. One or more guide stops may be provided on the shelf 39 to facilitate accurate positioning of the pot in place.

Figure 4:
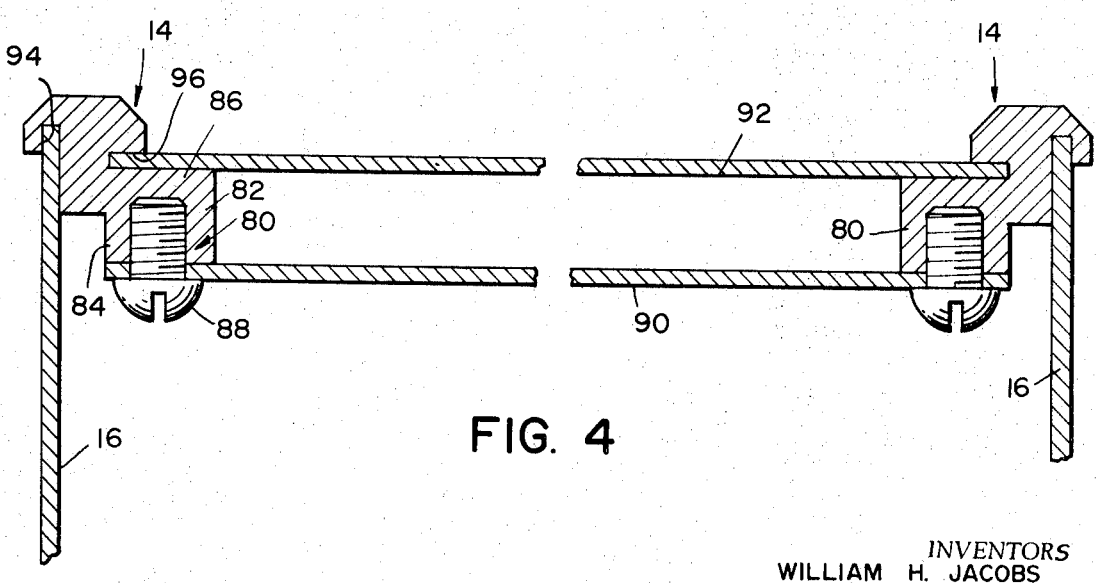
FIG. 4 is an enlarged fragmentary detail of the framing of the housing.

It is of course, beneficial to be able to get at the interior of the dispenser so as to make adjustments, repair or replace parts, clean the interior, and check various connections, and the construction of the dispenser unit is such that the side panels 16 may readily be removed so as to expose the interior of the housing. The extruded frame members 14 are shown in enlarged form in FIG. 4. In FIG. 1 it will be noted that two endless frame members 14 support the various panels which define the housing enclosure, and the panels may be removed without disturbing the various functioning parts of the assembly. In FIG. 4, each of the two frame members 14 is shown to include a U-shaped channel section 80 defined by arms 82 and 84 and rear wall 86. The sides of the channel member 80 defined by the walls 82 and 84 are ribbed so as to form effectively parallel threads which receive screws at any point in the channel. Such screws 88 are shown screwed into the channels and connecting the two channels by a structural bracer span 90. Several such spans are employed about the housing to connect the left and right frame members 14 so as to keep them properly spaced and rigidify the housing. The side panels 16 and the rear panel 92 shown in FIG. 4 do not structurally add to the assembly but rather merely form enclosures for it. Slots 94 and 96 are formed in the members 14 at right angles to one another, which slots accept the edges of the panels. The panels may be removed by sliding them out of the slots in the members 14 or by disconnecting the bracer spans.

The operation of the dispenser may be described with reference to the schematic diagram of FIG. 3. In that FIG. the various electrical parts of the assembly are shown connected between lines 100 and 102. An on-off switch 104 is shown in line 102, and it includes a pilot light 106 to indicate visually when the machine is on. The switch 104 may be mounted on the front panel 58 of the dispenser adjacent the funnel 60 beneath the hood 18 so that it is not visible or likely to be actuated by an unauthorized party. When the switch 104 is closed to turn the dispenser on, the timer 22 which includes the control knob mounted on the front panel 58 is energized as is the circuit 108 which includes the thermostat 42 and the heater 40 within the tank 26. The thermostat will of course, maintain the water temperature in the tank at the desired level just so long as the rate of withdrawal from the tank 26 does not exceed the heating capacity of heater 40.

The timer 22 controls one circuit numbered 1 in the diagram which includes the gear motor 34 that drives the worm feed 37 as well as the solenoid valve 39, and it controls a second circuit numbered 2 which includes the whipping motor 32. The timer 22 which may be of conventional design energizes circuit number 2 which includes the whipping motor 32 for four seconds longer than circuit number 1 which includes the gear motor 34 and solenoid valve 30. As a result, the propeller 76 in the whipper assembly 36 runs for 4 seconds longer than does the water which flows from the tank 26 to the funnel 60 and the powder which is dumped from the pot 38 into the funnel. The advantages of this system were described above. While 4 seconds is recited as the time interval between shutting off the motors 34 and 32, it is to be understood that this interval may be changed, as will be apparent in connection with the description of FIGS. 4—8.

The timer 22 may be actuated by merely pressing the knob 110, but the knob may also be turned to vary the cycle time. Normally, the timer cycle may be from 0 to 10 seconds for the circuit which includes the gear motor and solenoid valve, and the cycle for the whipping motor 32 is 4 seconds longer.

Figure 3:
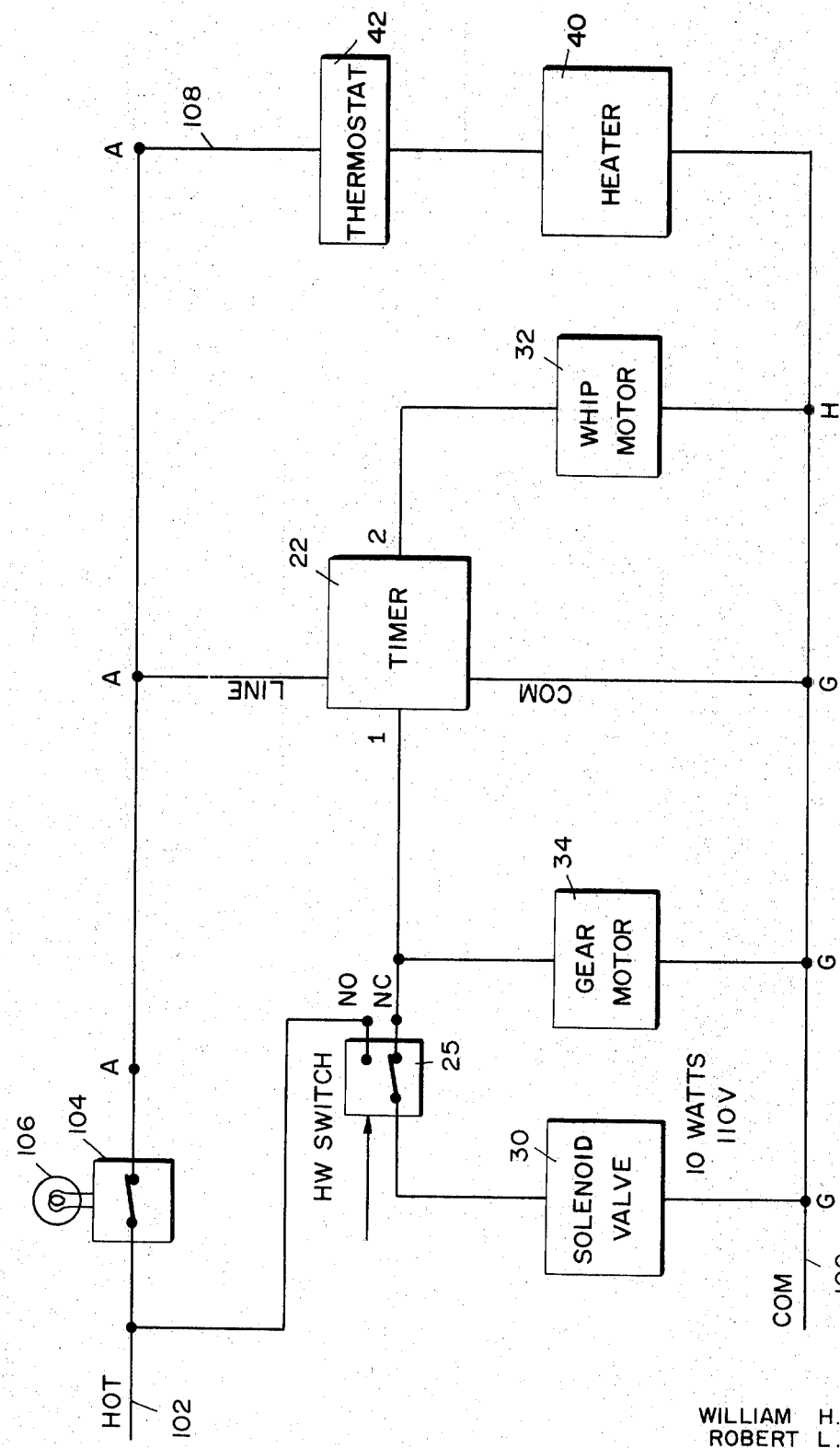
FIG. 3 is a schematic diagram of the timing circuit of the dispenser.

It will be noted in FIG. 3 that a hot water switch 25 is provided in the circuit for the purpose of allowing hot water to be drawn from the dispenser without chocolate. The manual throw switch is shown to lie in the front panel 58 of the dispenser in FIG. 1. When the switch 25 is thrown, it is evident that the solenoid 30 is energized directly across the line, and the on-off switch 104 and the timer 22 are bypassed. Thus, a user may draw hot water from the tank 26 merely by pressing the switch 25 on the front panel of the dispenser, and so long as the switch is depressed, hot water will flow.

The pot 38 normally also includes an agitator blade (not shown) which maintains the powder in the pot relatively free of lumps, and maintains a smooth feed in the pot to the bottom section which contains the worm feed 37. The pot typically may be a model manufactured by Vendomatic Sales, Inc. of Minneapolis, Minnesota. Similarly, the whipper assembly 36 may be of standard design of the type manufactured by Vendomatic Sales.

The timer 22 which provides for adjustable portion control is shown in detail in FIGS. 5—8, and includes a starting or tripping shaft 120 that carries the knob 110 on its end 122, a cycle adjustment knob 124 with its associated stop 126, a rotatably mounted cam 128 and its drive gear 130, a pair of normally open contacts 132 forming switch 134, and a microswitch 136. The drive gear 130 is shown in FIG. 5 to be driven by the splined shaft 138 of the timer motor 140, and a friction clutch 142 carried on the front face of the gear 130 engages the cam 128 to rotate it with the gear.

The rear face of cam 128 has a recess 144 into which extends the arm 146 of the lower blade 134a of switch 134. When the arm 146 lies in the recess, the contacts 132 are open, and when the arm 146 is supported on the face of the cam about its periphery, the switch 132 is closed.

The microswitch 136 is normally open, and it is controlled by the switch actuator 148 which includes post 150 movable in arcuate slot 152 in plate 154. The post 150 is carried by a fin 156 and is biased to the position shown in FIG. 6 by the coil spring 158 which is wound about the base of the knob 124 with one end anchored to the fixed post 160. The post 150 is moved in the slot 152 and away from the position shown in FIG. 6 by the block 162 carried by the cam 128. When the cam rotates clockwise as viewed from the top in FIG. 5 and as viewed in FIG. 8, the block 162 will move away from the stop 126 and after travelling approximately 150° it will pick up the post 150 and cause it to release the microswitch 136 so that it may assume its normally open condition. This is shown in FIG. 7, and it will further be noted in that FIG. that the arm 146 has dropped into recess 144 to open the contacts 132. In FIG. 8 the arm 146 is shown on the face of the cam 128 and the contacts 132 are therefore closed.

The condition of the switches 134 and 136 and the angular position of the cam 128 are shown "off" in FIG. 7; that is, the circuit of FIG. 3 is not operating. To start the cycle, the operator presses the button 110 which moves the shaft 120 upwardly as viewed in FIG. 5, and the shaft 120 lifts the gear 130 and its clutch from the face of the cam 128. As the gear 130 lifts, it lifts the switchblade 134b, and it in turn lifts the lower blade 134a through the connecting pin 161, and arm 146 moves out of the recess 144. The cam is then free to turn counterclockwise as viewed in FIG. 7 under the influence of its spring 164 until the block 162 engages the stop 126 as in FIG. 8. This action releases the post 150 and it closes microswitch 136. When the button 110 is released, the arm 146 is supported on the cam periphery, and switch 134 closes as in FIG. 5. The timer motor 140 immediately begins to turn the cam 128 clockwise as viewed in FIG. 8, against the influence of spring 164, and the block 162 picks up the post 150 to reopen the microswitch 136 after several seconds. The motor 140 continues to drive the gear 130 and cam 128 until the arm 146 falls into recess 144 and switch 134 reopens. Because the microswitch 136 lies in circuit 1 that circuit is deenergized several seconds before circuit 2 which contains switch 134. The speed of rotation of the motor 140 and the angular separation of the block 162 and recess 144 determines that the interval is 4 seconds. The total cycle time may be changed by rotating the knob 124. The knob carries fin 166 which in turn carries the stop 126, and when the fin 166 is turned counterclockwise as viewed in FIGS. 7 and 8 it is apparent that cycle time of the control will be increased, for a greater period will be required for the cam block 162 to move the post 150 off microswitch 136 and open the switch 134. Thus, the size of the drink dispensed from the machine may be changed merely by turning the knob 124. Typically, the machine may have a scale or a few stops provided on the front panel 58 which cooperate with a pointer on the knob to indicate the appropriate setting for the knob to obtain the various sizes of drinks.

From the foregoing description it will be appreciated that hot water is fed from the tank 26 through the discharge tube 56 as the water in the tank is displaced by water entering the tank through the T-fitting 52. The pressure exerted in the tank by the water entering it is maintained constant by a flow control (not shown) disposed in the solenoid valve 30. This flow control in the solenoid may be of standard design and of the type which compensates for changes in the line pressure through changes in orifice size so that the pressure on the downstream side of the control remains constant regardless of the pressure on the upstream side. By maintaining the pressure constant on the tank when the tank 26 is being filled, the same amount of liquid will be discharged from the tank 26 through the tube 56 during a given time interval. Because the operation of the dispenser is time controlled, it is important for accurate metering that this condition exist. If the pressure in the tank changed from time to time because of line pressure, it is evident that different quantities of water would be discharged from the tank during a particular time interval with changes in tank pressure. With this control over the volume of water discharged during any given time interval, constant proportion between water and chocolate is assured, particularly with the fine adjustment made possible by the needle valve 50.

From the foregoing description, those skilled in the art will appreciate that each of the objects set forth in the introduction of this application are accomplished with the structure shown. Because numerous modifications may be made of this invention without departing from its spirit, it is not intended to limit the invention to the single embodiment illustrated and described. Rather, it is intended that the scope of this invention be determined by the appended claims and their equivalents.

We claim:

1. A hot beverage dispenser comprising:
    a housing;
    a heating tank for water having a feed line, mounted in the housing and a flavor powder pot mounted on the housing in a readily accessible location;
    said tank being connected to a source of water and having a pressure of constant value when it is being filled, said tank discharging its heated water under constant pressure in response to water being fed to the tank;
    a discharge assembly including a funnel and a whipping chamber mounted on the housing through which water and powder from the tank and pot are discharged;
    a fitting which discharges the water at a high velocity due to said pressure from the tank into the funnel in a tangential direction with respect to the funnel to cause the water to swirl in a vortex within the funnel;
    feeding means in the pot for discharging powder in the pot into the funnel within the standing water vortex and a feed motor for energizing the feeding means;
    a valve in the feed line for controlling the flow of water to the tank to control the discharge of water from the tank to the discharge assembly;
    a whipping mechanism including a propeller in the chamber for mixing the water and flavor powder discharged into the chamber from the funnel, and a whipper motor in the housing for driving the propeller;
    means including a variable timer for opening the valve and energizing the motor for selected periods to provide different measured sizes of beverages; an
    a circuit including the timer for energizing the whipper motor.

2. A hot beverage dispenser as described in claim 1 further characterized by: said timer energizing the whipper motor for a period of several seconds after the valve is closed and the feed motor is deenergized.

3. A hot beverage dispenser as described in claim 2 further characterized by:
    said valve being a solenoid operated valve;
    said means including the variable timer comprising a second circuit controlled by the timer for energizing the valve and the feed motor; and
    a manually operable switch in the second circuit for opening the valve to discharge hot water without energizing the feed motor that discharges powder.

4. A hot beverage dispenser as described in claim 2 further characterized by:
    a pedestal supporting the housing;
    a drain tube connected at one end to the tank and disposed within the pedestal; means retaining the other end of the tube outside the pedestal; and
    an opening in the pedestal allowing the drain tube to be substantially withdrawn from the pedestal which is connected to the tank.

5. A hot beverage dispenser as described in claim 3 further characterized by manual means for varying the period that the valve is open and the motors are energized for varying the portion size without varying said several seconds period.

6. A hot beverage dispenser as defined in claim 1 further characterized by:
    a flat shelf provided as part of the housing which supports the flavor powder pot, said pot discharging its powder contents through an opening in its side in front of the housing; and
    a removable hood joining the housing and covering the pot when it is supported on the shelf.